Feb. 8, 1927.  
F. KREISEL  
1,616,534

COMBINED PRIMER AND GAS MIXER

Filed April 14, 1924

INVENTOR  
Fred Kreisel.  
BY  
ATTORNEY

Patented Feb. 8, 1927.

1,616,534

UNITED STATES PATENT OFFICE.

FRED KREISEL, OF AVA, MISSOURI.

COMBINED PRIMER AND GAS MIXER.

Application filed April 14, 1924. Serial No. 706,458.

One object of my invention is to provide a combined primer and gas mixing device whereby all the cylinders of a multiple cylinder engine may be primed at one time, and at the same time the priming liquid may be as finely divided as possible on entering the cylinder.

Another object of my invention is to provide means whereby additional air may be admitted to the cylinders at the will of the operator.

Another object of my invention is to provide means for more thoroughly and completely mixing the gas and air at the point of ingress to the cylinder.

A still further object of my invention is to provide for the more thorough and complete mixing of the fuel and air before its ingress to the cylinders.

Other objects and advantages of my improved primer and mixer will appear in the following description and claim of novelty.

Referring to the drawings.

One objection to the ordinary priming cups is the fact that the liquid for priming flows into the cylinder in an entirely raw state and more or less in the form of drops or large globules and in this form the liquid tends to cling to the cylinder walls or leech into the crankcase.

To avoid this objection I have provided means of introducing additional air with the liquid and provided with an obstruction in the cylinder port that will tend to break up the liquid into a fine spray and more thoroughly mix it with the incoming air.

It is a well known that air admitted through the intake manifold at a point between the carburetor and the cylinders tends to lean the mixture and furnish more complete combustion.

The objection to the admission of air as described is that it causes considerable acceleration in the speed of the motor which prevents low idling speeds. To avoid this objection I have provided for dash board control so that the amount of air admitted can be controlled by the operator by means of a convenient adjusting lever passing through the dash of the car.

Another objection to admitting air to the cylinders at a point beyond the carburetor is that because of the shorter distance from the point where the air is admitted than from the carburetor, the natural suction of the engine draws more freely on the auxiliary air than from the carburetor, that is less air passes through the carburetor than normally and, consequently, the auxiliary air admitted is not thoroughly mixed with the charge from the carburetor. In order to make this mixture more thorough and complete, I have provided means for retarding the inflow of gases into the cylinders and have created a vertical movement at the point of entrance into the cylinder.

My improved device assists combustion by providing sufficient air at the time the carburetor fails to do so, by admitting it automatically when the engine is started, and may be manually shut off.

Figure 1:
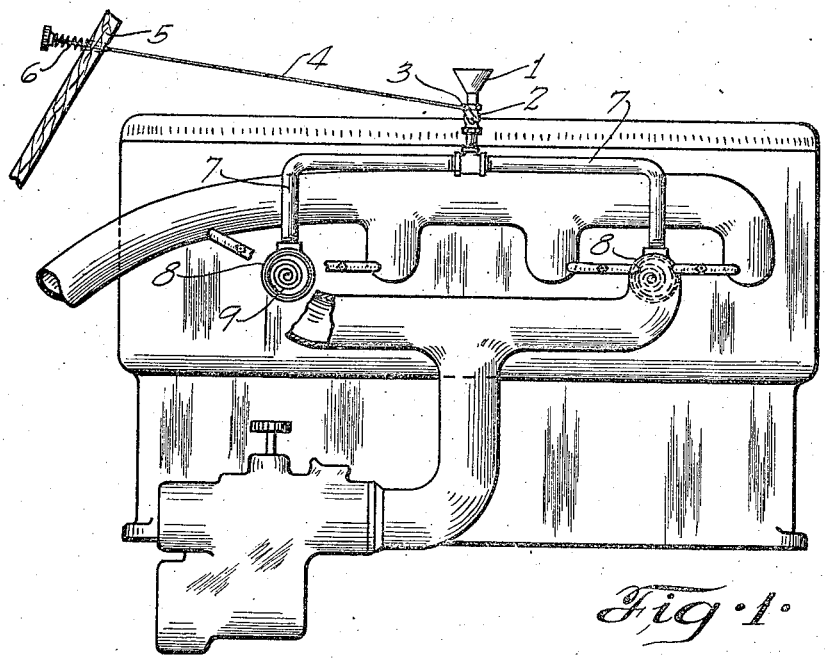
Fig. 1 is a side elevation of an engine equipped with my device, having the intake manifold broken away.
Figure 3:
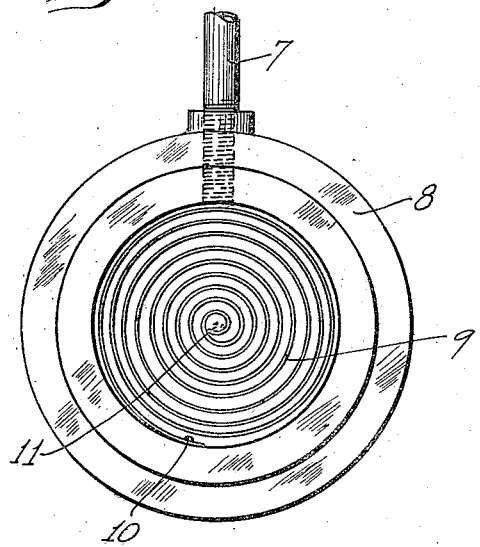
Fig. 3 is a plan view of the priming device at the point adjoining the cylinder.
Figure 2:
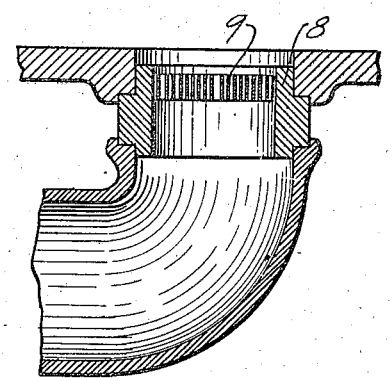
Fig. 2 is a longitudinal section of an intake manifold with my device installed.

In Fig. 1, I show a four cylinder engine equipped with my attachment. A priming funnel 1 is equipped with a butterfly valve at 2, having an operative lever arm 3 connected by means of a rod 4, adapted to be passed in through the dash 5, where the valve is normally held open by means of a helical spring 6, one end of the spring abutting against the dash 5 and the other end against the head of the rod 4. When it is desired to close the valve, the rod is pressed outward to compress the spring. The valve is in open communication with a conduit 7 disposed in close contact with the longitudinal exterior of the exhaust manifold. Each end of the conduit 7 is in open communication with an annular metal gasket or insert 8, adapted to form an air-tight joint between the end of the intake manifold and the intake ports of the cylinder block. Within said annular gasket, disposed vertical to its longitudinal axis, is disposed a closely coiled concentric spring 9, as shown in Fig. 2, the end of the major coil 10 Fig. 3 being rigidly attached to the inner periphery of the annular gasket and the end of the minor coil 11 is left free to vibrate at the center of the concentrically coiled spring 9.

It is readily apparent that when it becomes necessary to prime an engine to start it, my system greatly facilitates the operation, because it is only necessary to fill one priming cup for all cylinders; whereas, the usual method requires that either the spark plugs must be taken out of each separate cylinder, or where primers are provided, each cylinder must be primed separately. This often results in great inconvenience as well as loose, leaky joints. In my improved method no joints are broken, no tools are required and all cylinders are primed at once.

While it is conceded that heat is the only agent known that will disintegrate the molecules or break them up into atoms, it is important that the fuel be as finely divided as possible by mechanical means, so that there will be more surface exposed to absorb heat and, consequently, it is advantageous to direct the heated air into the midst of the finely comminuted vapor, as I do, instead of applying the heated air to the surface of a stream by means of convection or contact with the inner surfaces of an externally heated manifold.

As the piston descends, creating a vacuum into which the vapor rushes with great velocity through an open port, the heavier portions of the charge naturally sink to the bottom of the intake conduit and follow the piston downward, leaving the lighter and leaner portions of the charge in the upper portion of the cylinder, so that ignition takes place in the weakest portion of the charge and combustion or flame propagation is relatively slow. To avoid this contingency and to make combustion more complete and flame propagation more rapid, I utilize the kinetic energy of the inflowing gases to create a vertical movement or turbulence by the interposition of a vibrating concentric coil against which the inflowing charge strikes with considerable force, and into the midst of the vertical movement of the gases increased air is drawn in, so that a more perfectly mixed charge, thoroughly turbulent and homogeneous, results and almost complete and perfect combustion takes place at every power stroke. Complete combustion means complete absence of carbon, a smoother running motor, because the power strokes are more uniform, less vibration, because of more equal explosions, gas economy, because of more uniform and regular charges, and less crankcase dilution, because of more complete combustion.

The above is a full, exact and accurate description of my invention, and what I claim as new and useful and desire to secure by Letters Patent is:

A combined primer and gas mixing device comprising in combination a conduit having its upper end funnel-shaped and adapted to receive gases or liquids, a manually controlled valve in said conduit adapted to open and close said conduit, said conduit being in open communication with a second conduit positioned at right angles to said first conduit, its upper end turned downwardly and in open communication with a hollow annular member adapted to be inserted between a normal intake manifold of a gas engine and the entrance ports of the cylinders of said engine, a control rod attached to the arm of a butterfly valve located in the said first mentioned conduit and having the opposite end of said control rod leading through the dash and provided with a compression spring to hold the said valve normally in a closed position, a concentrically coiled spring having one end attached to the interior wall of the afore-mentioned annular member and having its opposite end unrestrained, said concentrically coiled spring being positioned in a plane at right angles to the stream line of the inflowing gases, said spring being adapted to be vibrated both by the natural jar of the moving car and, also, by the inflow of gases thereby adapted to mix the air and gas as they enter the cylinder.

This specification signed this 8th day of April, 1924.

FRED KREISEL.